(12) United States Patent
Chen

(10) Patent No.: US 12,235,475 B2
(45) Date of Patent: Feb. 25, 2025

(54) FLEXIBLE RETROREFLECTIVE SHEETING

(71) Applicant: Avery Dennison Corporation, Mentor, OH (US)

(72) Inventor: Chieh-Wen Chen, Willoughby Hills, OH (US)

(73) Assignee: Avery Dennison Corporation, Mentor, OH (US)

( * ) Notice: Subject to any disclaimer, the term of this patent is extended or adjusted under 35 U.S.C. 154(b) by 776 days.

(21) Appl. No.: 17/429,117

(22) PCT Filed: Feb. 4, 2020

(86) PCT No.: PCT/US2020/016591
§ 371 (c)(1),
(2) Date: Aug. 6, 2021

(87) PCT Pub. No.: WO2020/163340
PCT Pub. Date: Aug. 13, 2020

(65) Prior Publication Data
US 2022/0082737 A1   Mar. 17, 2022

Related U.S. Application Data

(60) Provisional application No. 62/802,804, filed on Feb. 8, 2019.

(51) Int. Cl.
*G02B 5/124* (2006.01)
*B32B 3/30* (2006.01)
(Continued)

(52) U.S. Cl.
CPC ............... *G02B 5/124* (2013.01); *B32B 3/30* (2013.01); *B32B 38/06* (2013.01); *G02B 1/04* (2013.01); *B32B 2307/416* (2013.01)

(58) Field of Classification Search
CPC .......... G02B 5/124; G02B 5/12; G02B 5/122; G02B 5/136; G02B 1/04; B32B 3/30;
(Continued)

(56) References Cited

U.S. PATENT DOCUMENTS 5,264,063 A   11/1993   Martin
5,298,307 A    3/1994   Suzuki et al.
(Continued)

FOREIGN PATENT DOCUMENTS

CN    1213311    8/2005
CN    1250985    4/2006
(Continued)

OTHER PUBLICATIONS

International Preliminary Report on Patentability dated Aug. 10, 2021 issued in corresponding IA No. PCT/US2020/016591 filed Feb. 4, 2020.
(Continued)

*Primary Examiner* — Derek S. Chapel
*Assistant Examiner* — Adam W Booher

(57) ABSTRACT

Provided herein is flexible retroreflective sheeting that includes an emboss layer having retroreflective elements, a backing layer and/or metallized layer in contact with the retroreflective elements, and an interleaf layer sandwiched between two adhesive layers. The tensile and color properties of the layers of the construction allow the sheeting to be particularly useful as a label for articles, e.g., traffic safety devices, subject to crushing or bending. Also provided are methods and articles including the provided sheeting.

44 Claims, 1 Drawing Sheet

(51) Int. Cl.
*B32B 38/06* (2006.01)
*G02B 1/04* (2006.01)

(58) Field of Classification Search
CPC ..... B32B 3/26; B32B 38/06; B32B 2307/416; B32B 2307/41; B32B 2307/414
See application file for complete search history.

(56) References Cited

U.S. PATENT DOCUMENTS

| | | | |
|---|---|---|---|
| 5,614,286 | A | 3/1997 | Bacon, Jr. et al. |
| 5,861,211 | A * | 1/1999 | Thakkar ............. C09J 7/22 428/355 R |
| 6,010,770 | A | 1/2000 | Walters |
| 6,161,186 | A | 12/2000 | Smith |
| 6,274,221 | B2 | 8/2001 | Smith et al. |
| 6,325,515 | B1 | 12/2001 | Coderre et al. |
| 6,350,034 | B1 | 2/2002 | Fleming et al. |
| 6,375,776 | B1 | 4/2002 | Buoni et al. |
| 6,569,510 | B1 | 5/2003 | Menon et al. |
| 6,592,967 | B2 | 7/2003 | Kaufman |
| 6,652,954 | B2 | 11/2003 | Nielsen et al. |
| 6,676,261 | B2 | 1/2004 | Mullen et al. |
| 6,708,299 | B1 | 3/2004 | Xie |
| 6,805,933 | B2 | 10/2004 | Patel et al. |
| 6,935,756 | B2 | 8/2005 | Sewall et al. |
| 6,953,624 | B2 | 10/2005 | Bacon, Jr. |
| 6,958,179 | B2 | 10/2005 | Carlson et al. |
| 7,025,847 | B2 | 4/2006 | Carlson et al. |
| 7,048,989 | B2 | 5/2006 | Watkins et al. |
| 7,111,949 | B2 | 9/2006 | Parisi et al. |
| 7,347,571 | B2 | 3/2008 | Bacon, Jr. |
| 7,364,314 | B2 | 4/2008 | Nilsen et al. |
| 7,374,297 | B2 | 5/2008 | Moreau |
| 7,503,664 | B2 | 3/2009 | Moreau |
| 7,547,105 | B2 | 6/2009 | Bacon, Jr. et al. |
| 7,556,387 | B2 | 7/2009 | Moreau |
| 7,611,251 | B2 | 11/2009 | Thakkar et al. |
| 7,771,059 | B2 | 8/2010 | Moreau |
| 7,862,187 | B2 | 1/2011 | Thakkar et al. |
| 8,003,197 | B2 | 8/2011 | Yukawa et al. |
| 8,267,533 | B2 | 9/2012 | Buoni |
| 8,297,761 | B2 | 10/2012 | Thakkar et al. |
| 8,317,341 | B2 | 11/2012 | Kim |
| 8,360,586 | B2 | 1/2013 | Buoni |
| 8,726,551 | B2 | 5/2014 | Peck et al. |
| 9,229,135 | B2 | 1/2016 | Kamiyama et al. |
| 9,285,531 | B2 | 3/2016 | Sharman et al. |
| 9,366,789 | B2 | 6/2016 | Thakkar et al. |
| 9,366,790 | B2 | 6/2016 | Spurgeon et al. |
| 9,547,109 | B2 | 1/2017 | Hannington et al. |
| 9,618,663 | B2 | 4/2017 | Smith et al. |
| 9,971,074 | B2 | 5/2018 | Chatterjee et al. |
| 10,031,266 | B2 | 7/2018 | Pricone |
| 10,094,960 | B2 | 10/2018 | Chatterjee et al. |
| 10,132,969 | B2 | 11/2018 | Smith et al. |
| 10,459,131 | B2 | 10/2019 | Nakazawa et al. |
| 10,877,191 | B2 | 12/2020 | Patel et al. |
| 2011/0211257 | A1 | 9/2011 | Hannington et al. |
| 2013/0114143 | A1 | 5/2013 | Thakkar et al. |
| 2015/0369975 | A1 | 12/2015 | Free et al. |
| 2016/0139306 | A1 | 5/2016 | Chatterjee et al. |
| 2016/0144581 | A1 * | 5/2016 | Chapman ......... B29D 11/00625 359/530 |
| 2016/0370514 | A1 | 12/2016 | Pavelka et al. |
| 2017/0329061 | A1 | 11/2017 | Nakazawa et al. |
| 2017/0357039 | A1 | 12/2017 | Ueda et al. |
| 2018/0188424 | A1 | 7/2018 | Patel et al. |
| 2018/0364403 | A1 | 12/2018 | Sharma et al. |
| 2019/0326462 | A1 | 10/2019 | Gao et al. |

FOREIGN PATENT DOCUMENTS

| | | |
|---|---|---|
| CN | 1256235 | 5/2006 |
| CN | 1269655 | 8/2006 |
| CN | 1299132 | 2/2007 |
| CN | 1307439 | 3/2007 |
| CN | 100447588 | 12/2008 |
| CN | 100447589 | 12/2008 |
| CN | 100526917 | 8/2009 |
| CN | 101103285 | 8/2010 |
| CN | 101405628 | 8/2010 |
| CN | 201622802 U | 11/2010 |
| CN | 101421645 | 6/2011 |
| CN | 101743491 | 1/2012 |
| CN | 101421646 | 4/2012 |
| CN | 102576104 | 7/2012 |
| CN | 104956242 | 9/2015 |
| CN | 204732112 U | 10/2015 |
| CN | 204807723 U | 11/2015 |
| CN | 105301683 | 2/2016 |
| CN | 102472832 | 4/2016 |
| CN | 105473325 | 4/2016 |
| CN | 105474051 | 4/2016 |
| CN | 102858528 | 5/2016 |
| CN | 102918430 | 8/2016 |
| CN | 205581337 U | 9/2016 |
| CN | 205581339 U | 9/2016 |
| CN | 104119824 | 11/2016 |
| CN | 205720752 U | 11/2016 |
| CN | 104483730 | 1/2017 |
| CN | 106597587 | 4/2017 |
| CN | 206074849 U | 4/2017 |
| CN | 106905871 | 6/2017 |
| CN | 206270526 U | 6/2017 |
| CN | 206301822 U | 7/2017 |
| CN | 106997067 | 8/2017 |
| CN | 107037526 | 8/2017 |
| CN | 206515500 U | 9/2017 |
| CN | 107436457 | 12/2017 |
| CN | 206960692 U | 2/2018 |
| CN | 107820573 | 3/2018 |
| CN | 207081843 U | 3/2018 |
| CN | 207301384 U | 5/2018 |
| CN | 105549136 | 6/2018 |
| CN | 105359008 | 10/2018 |
| CN | 108699788 | 10/2018 |
| CN | 107003443 | 1/2020 |
| EP | 1193511 | 4/2002 |
| EP | 1230084 | 12/2003 |
| EP | 3317702 | 5/2018 |
| EP | 3415963 | 12/2018 |
| JP | 6-40145 | 2/1994 |
| JP | 2008-015359 | 1/2008 |
| KR | 200330360 | 10/2003 |
| KR | 10-2008-0022325 | 3/2008 |
| KR | 10-1721515 | 3/2017 |
| WO | 2006/031043 | 3/2006 |
| WO | 2018/064089 | 4/2018 |
| WO | 2018/064198 | 4/2018 |
| WO | 2018/064203 | 4/2018 |
| WO | 2018/064212 | 4/2018 |
| WO | 2018/151759 | 8/2018 |
| WO | 2018/151760 | 8/2018 |
| WO | 2018/151761 | 8/2018 |
| WO | 2018/152473 | 8/2018 |
| WO | 2018/152475 | 8/2018 |
| WO | 2018/192261 | 10/2018 |
| WO | 2018/217519 | 11/2018 |

OTHER PUBLICATIONS

International Search Report and Written Opinion dated Aug. 21, 2020 issued in corresponding IA No. PCT/US2020/016591 filed Feb. 4, 2020.

Invitation to Pay Additional Fees dated Jun. 30, 2020 issued in corresponding IA No. PCT/US2020/016591 filed Feb. 4, 2020.

* cited by examiner

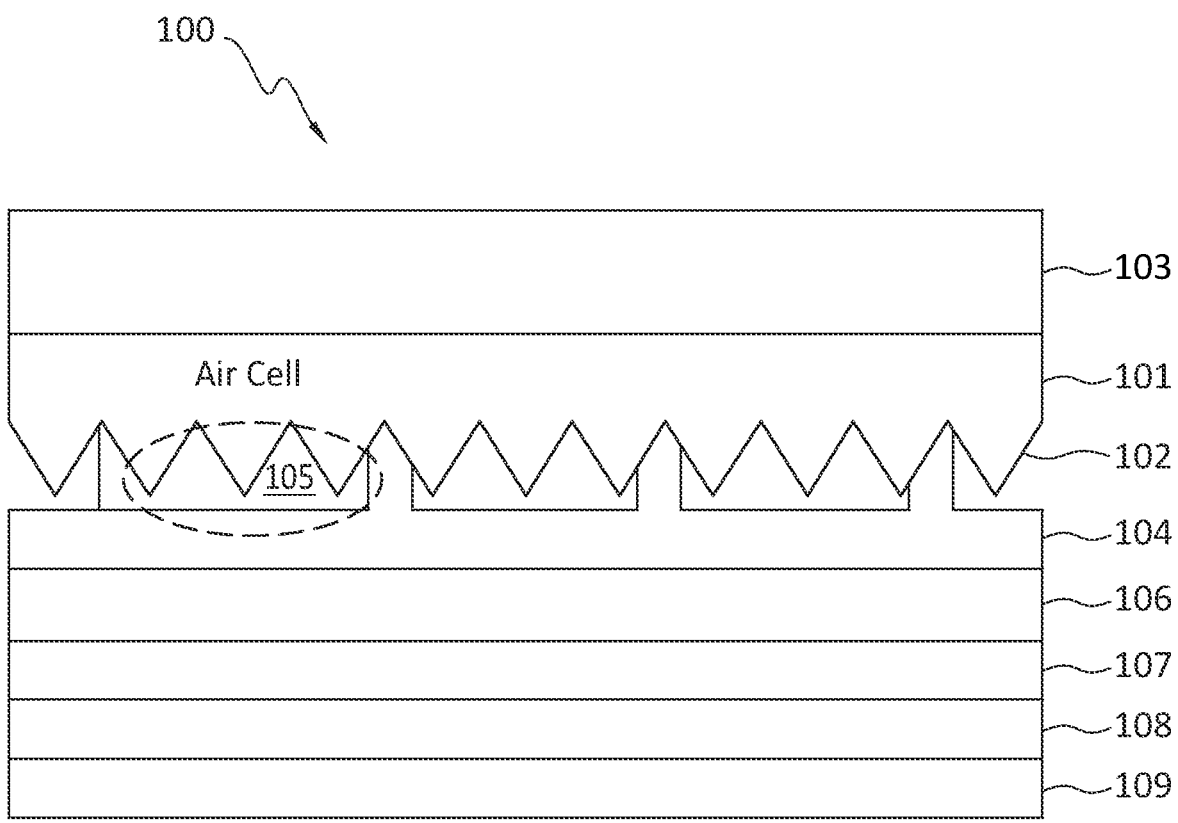

FLEXIBLE RETROREFLECTIVE SHEETING

CROSS-REFERENCE TO RELATED APPLICATION

The present application is a 371 of International Application No. PCT/US2020/016591, which was published in English on Aug. 13, 2020, and claims the benefit of U.S. Provisional Patent Application No. 62/802,804 filed Feb. 8, 2019, both of which are incorporated herein by reference in their entireties.

FIELD

The present disclosure relates generally to flexible retroreflective sheeting particularly useful for the labeling of traffic safety devices.

BACKGROUND

Traffic cones (pylons), are cone-shaped markers that are often placed on roads or footpaths to temporarily redirect traffic in a safe manner. The marker cones are frequently used, for example, to create separation or merge lanes during road construction projects or automobile accidents. In the United States, cones are required by the Federal Highway Administration's Manual on Uniform Traffic Control Devices (MUTCD) to be fitted with reflective white bands to increase night-time visibility. Reflective collars, such as white strips made from white reflective plastic, can be snugly slipped over the tops of cones and permanently or semi-permanently attached to the traffic cones with tape or adhesive. Similar reflective strips, tapes, or labels are also generally attached to other traffic safety devices, such as traffic barrels and barriers, to increase their visibility.

Because of their common locations on and near roads, traffic cones are highly susceptible to impacts from, for example, vehicular and pedestrian collisions, resulting in the crushing or bending of the cone surfaces. When traffic cones are deformed in this way, labels such as reflective collars attached to the cones are subjected to stresses that can damage the label integrity. This damage can create cracks within the label structure, revealing the surface of the cone beneath the cracked label, and disrupting the uniformity of the label appearance. The visual effect of the crack is particularly noticeable because of the significant contrast between the typical fluorescent orange color of traffic cones and other road safety devices, and the typical white color of reflective labels. In view of these undesirable effects, a need exists for improved flexible adhesive retroreflective sheeting.

SUMMARY

In one embodiment, the disclosure is to flexible retroreflective sheeting that includes an emboss layer, a flexible backing layer, a first adhesive layer, an interleaf layer, and a second adhesive layer. Preferably, the sheeting has a tensile strain ranging from 30% to 200%. The emboss layer has a back surface including a plurality of retroreflective elements. The flexible backing layer is in contact with the emboss layer back surface. The first adhesive layer is connected to the flexible backing layer opposite the emboss layer. The interleaf layer has an opacity greater than 40% and is connected to the first adhesive layer opposite the flexible backing layer. Preferably, the interleaf layer has a CIEDE2000 color difference from the emboss layer color that is less than 20. Preferably, the interleaf layer includes a cavitated or pigmented film. The second adhesive layer is connected to the interleaf layer opposite the first adhesive layer.

In another embodiment the disclosure relates to a method for producing a flexible retroreflective sheeting having a flexible backing layer. The method includes thermally embossing an emboss layer, thereby forming a plurality of retroreflective elements on the emboss layer back surface. The method further includes connecting a flexible backing layer to the emboss layer back surface. The method further includes coating a first face of an interleaf layer with a first adhesive layer, and an opposite second face of the interleaf layer with a second adhesive layer, thereby forming a transfer tape. The method further includes laminating the transfer tape to the flexible backing layer opposite the emboss layer.

In another embodiment, the disclosure is to a flexible retroreflective sheeting that includes an emboss layer, a metallized layer, a first adhesive layer, an interleaf layer, and a second adhesive layer. Preferably, the sheeting has a tensile strain ranging from 30% to 200%. The emboss layer back surface includes a plurality of retroreflective elements. The metallized layer is located directly on the emboss layer back surface. The first adhesive layer is connected to the metallized layer opposite the emboss layer. The interleaf layer is connected to the first adhesive layer opposite the metallized layer, has an opacity greater than 40%, and has a CIEDE2000 color difference from the emboss layer color of less than 20. Preferably, the interleaf layer includes a cavitated or pigmented film. The second adhesive layer is connected to the interleaf layer opposite the first adhesive layer.

In another embodiment, the disclosure is to a method for producing a flexible retroreflective sheeting having a metallized layer. The method includes thermally embossing an emboss layer, thereby forming a plurality of retroreflective elements on the emboss layer back surface. The method further includes connecting a metallized layer directly to the emboss layer back surface. The method further includes coating a first face of an interleaf layer with a first adhesive layer, and an opposite second face of the interleaf layer with a second adhesive layer, thereby forming a transfer tape. The method further includes laminating the transfer tape to the metallized layer opposite the emboss layer.

In another embodiment, the disclosure is to a method of applying a flexible retroreflective sheeting to a surface. The method includes providing a surface having an outer face. The method further includes providing a flexible retroreflective sheeting as disclosed herein. The method further includes adhering the second layer of the flexible retroreflective sheeting to the outer face of the surface.

In another embodiment, the disclosure is to an article labeled with a flexible retroreflective sheeting as described herein. The article includes a surface having an outer face, and the flexible retroreflective sheeting adhered to the outer face of the surface.

BRIEF DESCRIPTION OF DRAWINGS

The disclosure references the appended drawings, wherein like numerals designate similar parts.

FIG. 1 illustrates a flexible retroreflective sheeting construction in accordance with an embodiment.

DETAILED DESCRIPTION

The present disclosure generally relates to retroreflective sheeting that, when employed for example as a retroreflective label for articles subject to crushing and bending, provides advantageous improvements in label integrity and hiding ability. For example, it is beneficial for sheeting, e.g., a cone collar, applied to traffic safety devices, e.g., a traffic cone, to be strong and flexible enough to not experience delamination or cracking if the device is handled roughly, stepped on, or driven over. It is also beneficial for the retroreflective sheeting to continue to conceal the underlying labeled surface, even in cases in which the label does develop a crack in one or more constituent layers. The ability of the sheeting to prevent the labeled surface from being seen can advantageously improve the uniformity of the appearance of the label.

It is difficult, however, for conventional retroreflective sheeting, labels, or tapes to meet these demands. One reason for this is that sheeting intended for application to traffic safety devices must be able to conform to the highly curved surfaces of cones, barrels, and barriers if it is to form a tight adhesion to these devices. The properties of such sheeting that promote such conformability are counter to those that promote rigidity and toughness, though, making conventional sheeting highly susceptible to cracking under force. Retroreflective sheeting in particular can include structural features known to be particularly likely to break when impacted. For example, air backed retroreflective sheeting includes layers that are not in complete contact with one another, as these partially connected layers form air gaps conferring retroreflectivity to the sheeting, These locations of incomplete contact between the layers can be a weak point likely to fracture under stress.

The inventors have now discovered that specific combinations of layers having the compositions and geometries disclosed herein surprisingly provide improved performance characteristics to retroreflective sheeting. In particular, it has been found that the use of certain interleaf layers, together in a construction with certain adhesive and emboss layers, can produce a multilayer retroreflective sheeting having advantageous tensile properties. Beneficially, these improved properties can give the provided sheeting greater resistance to cracking. Moreover, the disclosure also provides certain combinations of colors among different layers of the sheeting. Further advantages are thus realized in that a durable and opaque interior layer of the sheeting, e.g., the interleaf layer, can have a significantly similar color to that of an upper layer, allowing the interleaf layer to continue to hide an underlying surface and to visually blend in with the upper layer when the upper layer, e.g., an emboss layer, has developed fissures or cracks.

Retroreflective Sheeting

In one aspect, a flexible retroreflective sheeting is disclosed. The sheeting includes a multilayer construction having an emboss layer with retroreflective elements on its back surface, a flexible backing layer and/or a metallized layer at least partially in contact with the retroreflective elements, and a transfer tape connected to the backing layer or to the metallized layer. The transfer tape includes an at least partially opaque interleaf layer that is sandwiched between a pair of adhesive layers. The first adhesive layer connects the transfer tape to the backing or metallized layer, and the second adhesive layer can be an outer face of the sheeting to be adhered to an article.

FIG. 1 illustrates an exemplary embodiment of the provided sheeting. Shown in the FIGURE is a retroreflective sheeting construction 100. The sheeting includes an emboss layer 101 having a pattern of retroreflective elements 102 embossed into the emboss layer back surface. In some embodiments, and as shown in FIG. 1, the retroreflective elements are prisms or cube corner retroreflectors. The front surface of the emboss layer is attached to a face layer 103 that can provide, for example, a durable and/or printable exterior face of the sheeting. A flexible backing layer 104 is in contact with a portion of the emboss layer back surface, such that the backing layer and the retroreflective elements together define a plurality of air gaps 105. A first adhesive layer 106 is attached to the flexible backing layer, and an interleaf layer 107 is disposed between the first adhesive layer and a second adhesive layer 108. The sheeting also includes a release liner 109 attached to the second adhesive layer.

The composition and construction of the sheeting can be configured to provide the film with a tensile strain sufficient to allow the sheeting to deform with minimal or no breaking, e.g., cracking, when subjected to a tensile force. In this way, when the sheeting is applied to an object, such as a traffic cone, that is prone to being impacted or crushed by vehicular or pedestrian traffic, the likelihood that the integrity and uniformity of the sheeting will be affected can be reduced.

The tensile strain of the sheeting can, for example, range from 30% to 200%, e.g., from 30% to 132%, from 47% to 149%, from 64% to 166%, from 81% to 183%, or from 98% to 200%. The tensile strain of the sheeting can range from 30% to 150%, e.g., from 30% to 102%, from 42% to 114%, from 54% to 126%, from 66% to 138%, or from 78% to 150%. In terms of upper limits, the sheeting tensile strain can be less than 200%, e.g., less than 183%, less than 166%, less than 149%, less than 138%, less than 126%, less than 114%, less than 102%, less than 90%, less than 78%, less than 66%, less than 54%, or less than 42%. In terms of lower limits, the sheeting tensile strain can be greater than 30%, e.g., greater than 42%, greater than 54%, greater than 66%, greater than 78%, greater than 90%, greater than 102%, greater than 114%, greater than 126%, greater than 138%, greater than 149%, greater than 166%, or greater than 183%. Higher tensile strains, e.g., greater than 200%, and lower tensile strains, e.g., less than 30%, are also contemplated. The tensile strain can be measured using, for example, the standard protocol ASTM D828-16e1 (2016).

Similarly, the composition and construction of the sheeting can be configured to provide the film with a force at break sufficient to prevent the sheeting from breaking, e.g., cracking, when subjected to a force or load below a high threshold. The force at break of the sheeting can, for example, range from 20 lbf to 60 lbf, e.g., from 20 lbf to 44 lbf, from 24 lbf to 48 lbf, from 28 lbf to 52 lbf, from 32 lbf to 56 lbf, or from 36 lbf to 60 lbf. In terms of upper limits, the sheeting force at break can be less than 60 lbf, e.g., less than 56 lbf, less than 52 lbf, less than 48 lbf, less than 44 lbf, less than 40 lbf, less than 36 lbf, less than 32 lbf, less than 28 lbf, or less than 24 lbf. In terms of lower limits, the sheeting force at break can be greater than 20 lbf, e.g., greater than 24 lbf, greater than 28 lbf, greater than 32 lbf, greater than 36 lbf, greater than 40 lbf, greater than 44 lbf, greater than 48 lbf, greater than 52 lbf, or greater than 56 lbf. Larger forces at break, e.g., greater than 60 lbf, and smaller forces at break, e.g., less than 20 lbf, are also contemplated. The force at break can be measured using, for example, standard protocol ASTM D828-16e1 (2016).

The sheeting can also be configured to provide the film with a Young's modulus sufficient to permit the sheeting to withstand stretching or compression when under lengthwise forces. The Young's modulus of the sheeting can, for example, range from 45 ksi to 275 ksi, e.g., from 45 ksi to 183 ksi, from 68 ksi to 206 ksi, from 91 ksi to 229 ksi, from 114 ksi to 252 ksi, or from 137 ksi to 275 ksi. In terms of upper limits, the sheeting Young's modulus can be less than 275 ksi, e.g., less than 252 ksi, less than 229 ksi, less than 206 ksi, less than 183 ksi, less than 160 ksi, less than 137 ksi, less than 114 ksi, less than 91 ksi, or less than 68 ksi. In terms of lower limits, the sheeting Young's modulus can be greater than 45 ksi, e.g., greater than 68 ksi, greater than 91 ksi, greater than 114 ksi, greater than 137 ksi, greater than 160 ksi, greater than 183 ksi, greater than 206 ksi, greater than 229 ksi, or greater than 252 ksi. Larger Young's moduli, e.g., greater than 275 ksi, and smaller Young's moduli, e.g., less than 45 ksi, are also contemplated. The Young's modulus can be measured using, for example, the standard protocol ASTM D828-16e1 (2016).

Emboss Layer

The emboss layer can be colored or can be colorless. The emboss layer is generally substantially transparent but can in certain aspects be at least partially opaque. The material of the emboss layer can be selected from a wide variety of polymers, including, but not limited to, polycarbonates, polyesters, polystyrenes, polyarylates, styrene-acrylonitrile copolymers, urethane, acrylic acid esters, cellulose esters, ethylenically unsaturated nitrites, hard epoxy acrylates, acrylics and the like, with acrylic, polycarbonate, and polyurethane polymers being preferred. In some embodiments, the emboss layer comprises acrylic. In some embodiments, the emboss layer comprises polycarbonate. In some embodiments, the emboss layer comprises both acrylic and polycarbonate.

The emboss layer can have a thickness ranging, for example, from 0.5 mil to 10 mil, e.g., from 0.5 mil to 3 mil, from 0.7 mil to 4.1 mil, from 0.9 mil to 5.5 mil, from 1.2 mil to 7.4 mil, or from 1.7 mil to 10 mil. In terms of upper limits, the emboss layer thickness can be less than 10 mil, e.g., less than 7.4 mil, less than 5.5 mil, less than 4.1 mil, less than 3 mil, less than 2.2 mil, less than 1.7 mil, less than 1.2 mil, less than 0.9 mil, or less than 0.7 mil. In terms of lower limits, the emboss layer thickness can be greater than 0.5 mil, e.g., greater than 0.7 mil, greater than 0.9 mil, greater than 1.2 mil, greater than 1.7 mil, greater than 2.2 mil, greater than 3 mil, greater than 4.1 mil, greater than 5.5 mil, or greater than 7.4 mil. Larger thicknesses, e.g., greater than 10 mil, and smaller thicknesses, e.g., less than 0.5 mil, are also contemplated.

In certain aspects, the retroreflective elements of the emboss layer include an arrangement or pattern of prismatic elements embossed into or disposed onto the back surface of the emboss layer. The prismatic elements can be prismatic elements of any three-dimensional shape. In some embodiments, the prismatic elements include prismatic cube corners. In certain aspects, the retroreflective elements include an arrangement or pattern of beads, e.g., glass or ceramic microspheres.

Backing Layer

In some embodiments, a flexible backing layer is directly attached to a portion of the emboss layer back surface, and the flexible backing layer and the retroreflective elements define a plurality of air gaps. These air gaps can be at least partially responsible for the retroreflective properties of the sheeting, by providing a material, e.g., air, that has a significantly different refractive index than that of the emboss layer and that is in intimate contact with the retroreflective elements.

The backing layer can be colored or can be colorless. The backing layer can be substantially transparent or can be substantially opaque. The materials and construction of the backing layer can be selected for properties such as flexibility. The flexible backing layer can include, for example, polyvinyl chloride, polycarbonate, ethylene-vinyl acetate, polyolefin, polyurethane, or a combination thereof. In some cases, the flexible backing layer comprises polycarbonate or polyvinyl chloride.

In some embodiments, the sheeting includes, in place of or in addition to a backing layer, a metallized layer. The metallized layer or metallic coating can include a metal such as aluminum, silver, or chromium. The metallized layer can be disposed directly onto the retroreflective elements. In certain aspects in which the sheeting includes a metallized layer, the sheeting further includes a backing layer that acts at least in part as a protecting layer protecting the metallic coating of the retroreflective elements.

Interleaf Layer

The composition and construction of the interleaf layer can be selected to provide the layer with an opacity high enough to block the view of materials and surfaces underlying the interleaf layer. In this way, the interleaf layer can assist in preventing the labeled surface beneath the sheeting from being visible, and can contribute to a uniform appearance of the sheeting. As used herein, the term "opacity" refers to the ratio of the reflectance of a film on a black substrate to that of an identical film on a white substrate The opacity of the interleaf layer can range, for example, from 40% to 100%, e.g., from 40% to 76%, from 46% to 82%, from 52% to 88%, from 58% to 94%, or from 64% to 100%. In terms of upper limits, the interleaf layer opacity can be less than 100%, e.g., less than 94%, less than 88%, less than 82%, less than 76%, less than 70%, less than 64%, less than 58%, less than 52%, or less than 46%. In terms of lower limits, the interleaf layer opacity can be greater than 40%, e.g., greater than 46%, greater than 52%, greater than 58%, greater than 64%, greater than 70%, greater than 76%, greater than 82%, greater than 88%, or greater than 94%. Lower opacities, e.g., less than 40%, are also contemplated. Opacity can be measured using, for example, the standard protocol ASTM D1003-13 (2013). The inventors have found that the use of these durable and sufficiently opaque interleaf layers, as disclosed herein, surprisingly provides the combined and synergistic benefits of resistance to cracking and the ability to hide cracks that may occur.

The composition and construction of the interleaf layer can also be selected to provide the layer with an color closely matching that of a covering layer of the sheeting. This can allow the interleaf layer to contribute to a uniform appearance of the sheeting in the event that the interleaf layer becomes visible through the covering layer, e.g., if the covering layer develops cracks. In certain aspects, the interleaf layer has a white color. In some embodiments, the interleaf layer is pigmented. In certain aspects, the interleaf layer has a yellow, e.g., fluorescent yellow, color. In certain aspects, the interleaf layer has a green, e.g., fluorescent green, color. In certain aspects, the interleaf layer has a yellow-green color. The difference between the colors of the interleaf layer and the covering layer can be expressed in terms of formulae, such as CIEDE2000 (2001), developed by the International Commission on Illumination (CIE). These formulae define a distance metric ($\Delta E^*$) having a value from 0 to 100, with values less than 1 indicating a color difference that is imperceptible to human vision, and a value of 100 indicating a difference between colors that are exact opposites of one another.

In some embodiments, the interleaf layer has a similar color to that of the emboss layer of the sheeting. The CIEDE2000 color difference between the interleaf layer color and the emboss layer color can range, for example, from 0 to 20, e.g., from 0 to 12, from 2 to 14, from 4 to 16, from 6 to 18, or from 8 to 20. In terms of upper limits, the difference between the interleaf color and the emboss color can be less than 20, e.g., less than 18, less than 16, less than 14, less than 12, less than 10, less than 8, less than 6, less than 4, or less than 2. In terms of lower limits, the difference between the interleaf color and the emboss color can be greater than 0, e.g., greater than 2, greater than 4, greater than 6, greater than 8, greater than 10, greater than 12, greater than 14, greater than 16, or greater than 18. Larger color differences, e.g., greater than 20, are also contemplated.

In some embodiments, the interleaf layer has a similar color to that of a backing layer of the sheeting. The CIEDE2000 color difference between the interleaf layer color and the backing layer color can range, for example, from 0 to 20, e.g., from 0 to 12, from 2 to 14, from 4 to 16, from 6 to 18, or from 8 to 20. In terms of upper limits, the difference between the interleaf color and the backing color can be less than 20, e.g., less than 18, less than 16, less than 14, less than 12, less than 10, less than 8, less than 6, less than 4, or less than 2. In terms of lower limits, the difference between the interleaf color and the backing color can be greater than 0, e.g., greater than 2, greater than 4, greater than 6, greater than 8, greater than 10, greater than 12, greater than 14, greater than 16, or greater than 18. Larger color differences, e.g., greater than 20, are also contemplated.

In some embodiments, the interleaf layer is cavitated, e.g., the interleaf layer includes a cavitated film. Cavitation agents of the cavitated film can include one or more inorganic and/or organic particulate solids. The cavitation agents can include an organic solid such as calcium carbonate. In some embodiments, the cavitation agents include one or more polymers, such as polyesters or polycarbonates. In certain aspects, the cavitation agents include polar polymers. The cavitation agents can include, for example, polybutylene terephthalate (PBT), polyethylene terephthalate (PET), polyethylene 2,6-naphthalate (PEN), polycarbonate (PC), or a combination thereof. The cavitation agent can added to the film in the form of a particulate solids concentrate or additive concentrate at 10 wt % to 90 wt % in a thermoplastic polymer carrier, such as a propylene polymer mixture.

In addition to color properties, the structural integrity of the interleaf layer can also be considered in selecting the materials and construction of the layer. The interleaf layer can include, for example, polyethylene terephthalate, polyvinyl chloride, polycarbonate, ethylene-vinyl acetate, polyolefin, polyurethane, or a combination thereof. In some embodiments, the interleaf layer comprises polyethylene terephthalate. In some embodiments, the interleaf layer comprises pigmented polyethylene terephthalate.

The interleaf layer can have a thickness ranging, for example from 0.2 mil to 4 mil, e.g., from 0.2 mil to 1.2 mil, from 0.3 mil to 1.6 mil, from 0.4 mil to 2.2 mil, from 0.5 mil to 3 mil, or from 0.7 mil to 4 mil. In terms of upper limits, the interleaf layer thickness can be less than 4 mil, e.g., less than 3 mil, less than 2.2 mil, less than 1.6 mil, less than 1.2 mil, less than 0.9 mil, less than 0.7 mil, less than 0.5 mil, less than 0.4 mil, or less than 0.3 mil. In terms of lower limits, the interleaf layer thickness can be greater than 0.2 mil, e.g., greater than 0.3 mil, greater than 0.4 mil, greater than 0.5 mil, greater than 0.7 mil, greater than 0.9 mil, greater than 1.2 mil, greater than 1.6 mil, greater than 2.2 mil, or greater than 3 mil. Larger thicknesses, e.g., greater than 4 mil, and smaller thicknesses, e.g. less than 0.2 mil, are also contemplated.

The ratio of the emboss layer thickness to the interleaf layer thickness can, for example, range from 0.1 to 20, e.g., from 0.1 to 2.4, from 0.2 to 4.1, from 0.3 to 6.9, from 0.5 to 11.8, or from 0.8 to 20. In terms of upper limits, the thickness ratio of the emboss layer to the interleaf layer can be less than 20, e.g., less than 11.8, less than 6.9, less than 4.1, less than 2.4, less than 1.4, less than 0.8, less than 0.5, less than 0.3, or less than 0.2. In terms of lower limits, the thickness ratio of the emboss layer to the interleaf layer can be greater than 0.1, e.g., greater than 0.2, greater than 0.3, greater than 0.5, greater than 0.8, greater than 1.4, greater than 2.4, greater than 4.1, greater than 6.9, or greater than 11.8. Higher ratios, e.g., greater than 20, and lower ratios, e.g., less than 0.1, are also contemplated. The inventors have found that maintaining the ratio of the emboss layer thickness to the interleaf layer thickness within these ranges and/or limits surprisingly provides for improvements in the ability to hide cracks that may occur. It is postulated that the interleaf layer must have sufficient thickness (with respect to the emboss layer, to conceal cracks. Without sufficient thickness, cracks will either occur in the interleaf layer or will be unable to be hidden due to the lack of opaque layering.

First and Second Adhesive Layers

The composition of the first adhesive layer can be selected to provide strong adhesion to the materials of the backing layer, metallized layer, or other layer to which the first adhesive layer will be attached. The composition of the second adhesive layer can be selected to provide strong adhesion to the surface materials of the article, e.g., a traffic device, to which the second adhesive layer will be attached. The compositions of the first and second adhesive layers can also be selected to provide strong adhesion to the materials of the interleaf layer. In certain aspects, the second adhesive layer is not present in the sheeting construction. In these cases, the interleaf layer can be an outer layer of the sheeting, and the sheeting can be configured to wrap tightly around the surface of an object, e.g., a traffic cone, such that an adhesive bond between the sheeting and the object is not required.

The first adhesive layer and the second adhesive layer can each independently include a pressure sensitive adhesive. In certain aspects, one or both of the first and second adhesive includes an emulsion. In certain aspects, one or both of the first and second adhesives includes a hot melt adhesive. In some embodiments, the adhesive may be formed from an acrylic based polymer. The adhesive can also be rubber-based, or a radiation curable mixture of monomers with initiators and other ingredients. Tackifiers, plasticizers, and other additives can be included in the adhesives to impart desired properties. Additives can include cutting agents such as waxes and surfactants, light stabilizers, heat stabilizers, ultraviolet absorbers, heat absorbers, and combinations thereof.

Face Layer

In certain aspects the sheeting includes a single face layer. The sheeting can also include two face layers, or more than two layers, arranged in a stacked configuration with different face layers having different properties and imparting different benefits to the multilayer sheeting. Each face layer of the sheeting can independently be colored or can be colorless. Each face layer of the sheeting can independently be substantially transparent or can be substantially opaque. The materials and construction of the layer can be selected for properties such as flexibility and printability. The face layer can include, for example, polyvinyl chloride, acrylic, polycarbonate, polyolefin, polyurethane, or a combination thereof. In some embodiments, the face layer comprises polyvinyl chloride.

The face layer can have a thickness ranging, for example, from 1 mil to 35 mil, e.g., from 1 mil to 8.4 mil, from 1.4 mil to 12 mil, from 2 mil to 17.2 mil, from 2.9 mil to 24.5 mil, or from 4.1 mil to 35 mil. In terms of upper limits, the face layer thickness can be less than 35 mil, e.g., less than 24.5 mil, less than 17.2 mil, less than 12 mil, less than 8.4 mil, less than 5.9 mil, less than 4.1 mil, less than 2.9 mil, less than 2 mil, or less than 1.4 mil. In terms of lower limits, the face layer thickness can be greater than 1 mil, e.g., greater than 1.4 mil, greater than 2 mil, greater than 2.9 mil, greater than 4.1 mil, greater than 5.9 mil, greater than 8.4 mil, greater than 12 mil, greater than 17.2 mil, or greater than 24.5 mil. Larger thicknesses, e.g., greater than 35 mil, and smaller thicknesses, e.g., less than 1 mil, are also contemplated.

The ratio of the face layer thickness to the emboss layer thickness can, for example, range from 0.1 to 70, e.g., from 0.1 to 5.1, from 0.2 to 9.8, from 0.4 to 18.9, from 0.7 to 36.4, or from 1.4 to 70. In terms of upper limits, the thickness ratio of the face layer to the emboss layer can be less than 70, e.g., less than 36.4, less than 18.9, less than 9.8, less than 5.1, less than 2.6, less than 1.4, less than 0.7, less than 0.4, or less than 0.2. In terms of lower limits, the thickness ratio of the face layer to the emboss layer can be greater than 0.1, e.g., greater than 0.2, greater than 0.4, greater than 0.7, greater than 1.4, greater than 2.6, greater than 5.1, greater than 9.8, greater than 18.9, or greater than 36.4. Higher ratios, e.g., greater than 70, and lower ratios, e.g., less than 0.1, are also contemplated.

The inventors have found that the relationship between the thickness of the face layer and the thickness of the interleaf layer can be critical in providing the sheeting with advantageous properties particularly useful in, for example, outdoor traffic safety applications. Importantly, by maintaining a sufficient face layer thickness relative to the interleaf thickness, the emboss layer and other underlying layers are protected from environmental degradation associated with outdoor use. In addition, if the interleaf thickness is not sufficiently large relative to the face layer thickness, then the aforementioned benefits in visible crack mitigation are not significantly realized. The ratio of the face layer thickness to the interleaf layer thickness can, for example, range from 0.2 to 175, e.g., from 0.2 to 11.6, from 0.4 to 22.9, from 0.8 to 45.1, from 1.5 to 88.9, or from 3 to 175. In terms of upper limits, the thickness ratio of the face layer to the interleaf layer can be less than 175, e.g., less than 88.9, less than 45.1, less than 22.9, less than 11.6, less than 5.9, less than 3, less than 1.5, less than 0.8, or less than 0.4. In terms of lower limits, the thickness ratio of the face layer to the interleaf layer can be greater than 0.2, e.g., greater than 0.4, greater than 0.8, greater than 1.5, greater than 3, greater than 5.9, greater than 11.6, greater than 22.9, greater than 45.1, or greater than 88.9.

Release Liner

In some embodiments, a release liner is connected to the second adhesive layer. The releasable liner can function as a protective cover such that the release liner remains in place until the sheeting is ready for attachment to an object or surface. If a liner or release liner is included in the sheeting, a wide array of materials and configurations can be used for the liner. In many embodiments, the liner is a paper or paper-based material. In many other embodiments, the liner is a polymeric film of one or more polymeric materials. Typically, at least one face of the liner is coated with a release material such as a silicone or silicone-based material. As will be appreciated, the release coated face of the liner is placed in contact with the otherwise exposed face of the second adhesive layer. Prior to application of the label to a surface of interest, the liner is removed to thereby expose the adhesive face of the label. The liner can be in the form of a single sheet. Alternatively, the liner can be in the form of multiple sections or panels.

Methods

The disclosure also relates to methods for producing the provided retroreflective sheeting. The methods include thermally embossing an emboss layer to form a plurality of retroreflective elements on the back surface of the emboss layer. The thermal embossing can include feeding the emboss layer to an embossing tool, heating the layer to allow the pattern on the tool to be pressed into the emboss layer material, and then cooling the layer. In certain aspects, the thermal embossing forms retroreflective elements on a back side of the emboss layer, and attaches a flexible face layer to an opposite front side of the emboss layer.

In some embodiments, the method includes connecting a flexible backing layer to the emboss layer back surface. In certain aspects, the connecting includes sealing the flexible backing layer to a portion of the emboss layer back surface, thereby defining a plurality of air gaps with the flexible backing layer and the retroreflective elements. In some embodiments, the method includes connecting a metallized layer to the emboss layer back surface. In certain aspects, the metallized layer is applied vacuum metallization. In certain aspects, the metallized layer is applied by sputtering or plasma coating.

The method also includes coating an interleaf layer with adhesive. A first face of the interleaf layer is coated with a first adhesive layer, and a second face of the interleaf layer is coated with a second adhesive layer. The interleaf layer and the adhesive layers together form a transfer tape that is then laminated to the backing layer or metallized layer of the sheeting. In some embodiments, a release liner is also attached to the exposed face of the second adhesive layer.

Embodiments

The following embodiments are contemplated. All combinations of features and embodiments are contemplated.

Embodiment 1: A flexible retroreflective sheeting comprising: an emboss layer having a front surface and an opposite back surface comprising a plurality of retroreflective elements; a flexible backing layer in contact with the emboss layer back surface; a first adhesive layer connected to the flexible backing layer opposite the emboss layer; an interleaf layer having an opacity greater than 40% and connected to the first adhesive layer opposite the flexible backing layer; and a second adhesive layer connected to the interleaf layer opposite the first adhesive layer.

Embodiment 2: An embodiment of embodiment 1, wherein the emboss layer has an emboss color, and wherein the interleaf layer has an interleaf color with a CIEDE2000 color difference from the emboss color of less than 20.

Embodiment 3: An embodiment of embodiment 1, wherein the emboss layer is transparent, wherein the flexible backing layer has a backing color, and wherein the interleaf layer has an interleaf color with a CIEDE2000 color difference from the emboss color of less than 20.

Embodiment 4: An embodiment of any of the embodiments of embodiment 1-3, wherein the interleaf layer comprises a cavitated film.

Embodiment 5: An embodiment of any of the embodiments of embodiment 1-4, wherein the flexible retroreflective sheeting has a tensile strain ranging from 30% to 200%.

Embodiment 6: An embodiment of any of the embodiments of embodiment 1-5, wherein the flexible retroreflective sheeting has a force at break ranging from 20 lbf to 60 lbf.

Embodiment 7: An embodiment of any of the embodiments of embodiment 1-6, wherein the flexible retroreflective sheeting has a Young's modulus ranging from 45 ksi to 275 ksi.

Embodiment 8: An embodiment of any of the embodiments of embodiment 1-7, wherein the interleaf layer has a thickness ranging from 0.2 mil to 4 mil.

Embodiment 9: An embodiment of any of the embodiments of embodiment 1-8, wherein the emboss layer has a thickness ranging from 0.5 mil to 10 mil.

Embodiment 10: An embodiment of any of the embodiments of embodiment 1-9, wherein the ratio of the emboss layer thickness to the interleaf layer thickness ranges from 0.1 to 20.

Embodiment 11: An embodiment of any of the embodiments of embodiment 1-10, wherein the interleaf layer comprises one or more polymers selected from the group consisting of polyethylene terephthalate, polyvinyl chloride, polycarbonate, ethylene-vinyl acetate, polyolefin, and polyurethane.

Embodiment 12: An embodiment of any of the embodiments of embodiment 1-11, wherein the flexible backing layer comprises one or more polymers selected from the group consisting polyvinyl chloride, polycarbonate, ethylene-vinyl acetate, polyolefin, and polyurethane.

Embodiment 13: An embodiment of any of the embodiments of embodiment 1-12, wherein the emboss layer comprises one or more polymers selected from the group consisting of acrylic, polycarbonate, and polyurethane.

Embodiment 14: An embodiment of any of the embodiments of embodiment 1-14, wherein the flexible backing layer is directly attached to a portion of the emboss layer back surface, and wherein the flexible backing layer and the retroreflective elements define a plurality of air gaps.

Embodiment 15: An embodiment of any of the embodiments of embodiment 1-14, wherein the first adhesive layer and the second adhesive layer each independently comprise a pressure sensitive adhesive.

Embodiment 16: An embodiment of any of the embodiments of embodiment 1-15, further comprising: a flexible face layer connected to the emboss layer front surface.

Embodiment 17: An embodiment of embodiment 16, wherein the flexible face layer has a thickness ranging from 1 mil to 35 mil.

Embodiment 18: An embodiment of embodiment 16 or 17, wherein the ratio of the flexible face layer thickness to the emboss layer thickness ranges from 0.1 to 70.

Embodiment 19: An embodiment of any of the embodiments of embodiment 16-18, wherein the ratio of the flexible face layer thickness to the interleaf layer thickness ranges from 0.2 to 175.

Embodiment 20: An embodiment of any of the embodiments of embodiment 16-19, wherein the flexible face layer comprises one or more polymers selected from the group consisting of acrylic, polycarbonate, polyolefin, and polyurethane.

Embodiment 21: An embodiment of any of the embodiments of embodiment 1-20, further comprising: a release liner attached to the second adhesive layer opposite the interleaf layer.

Embodiment 22: An embodiment of any of the embodiments of embodiment 1-21, wherein the flexible backing layer has a backing color, and wherein the interleaf layer has an opacity greater than 58% and an interleaf color with a CIEDE2000 color difference from the backing color of less than 10.

Embodiment 23: An embodiment of any of the embodiments of embodiment 1-22, wherein the interleaf layer has an opacity greater than 58%, and wherein the flexible retroreflective sheeting has a tensile strength ranging from 30% to 150%.

Embodiment 24: An embodiment of any of the embodiments of embodiment 1-23, wherein the flexible backing layer has a backing color, wherein the interleaf layer has an interleaf color with a CIEDE2000 color difference from the backing color of less than 10, and wherein the flexible retroreflective sheeting has a tensile strength ranging from 30% to 150%.

Embodiment 25: A method for producing a flexible retroreflective sheeting, the method comprising: thermally embossing an emboss layer, thereby forming a plurality of retroreflective elements on a back surface of the emboss layer; connecting a flexible backing layer to the emboss layer back surface; coating a first face of an interleaf layer with a first adhesive layer, and an opposite second face of the interleaf layer with a second adhesive layer, thereby forming a transfer tape; and laminating the transfer tape to the flexible backing layer opposite the emboss layer.

Embodiment 26: An embodiment of embodiment 25, wherein the connecting includes sealing the flexible backing layer to a portion of the emboss layer back surface, thereby defining a plurality of air gaps with the flexible backing layer and the retroreflective elements.

Embodiment 27: An embodiment of embodiment 25 or 26, wherein the thermally embossing further attaches a flexible face layer to a front surface of the emboss layer opposite the emboss layer back surface.

Embodiment 28: An embodiment of any of the embodiments of embodiment 25-27, further comprising: attaching a liner layer to the second adhesive layer opposite the interleaf layer.

Embodiment 29: A flexible retroreflective sheeting comprising: an emboss layer having a front surface and an opposite back surface comprising a plurality of retroreflective elements, wherein the emboss layer has an emboss color; a metallized layer directly on the emboss layer back surface; a first adhesive layer connected to the metallized layer opposite the emboss layer; an interleaf layer connected to the first adhesive layer opposite the metallized layer, wherein the interleaf layer has an opacity greater than 40% and an interleaf color with a CIEDE2000 color difference from the emboss color of less than 20; and a second adhesive layer connected to the interleaf layer opposite the first adhesive layer.

Embodiment 30: An embodiment of 29, wherein the interleaf layer comprises a cavitated film.

Embodiment 31: An embodiment of embodiment 29 or 30, wherein the flexible retroreflective film has a tensile strain ranging from 30% to 200%.

Embodiment 32: An embodiment of any of the embodiments of embodiment 29-31, wherein the flexible retroreflective film has a force at break ranging from 20 lbf to 60 lbf.

Embodiment 33: An embodiment of any of the embodiments of embodiment 29-32, wherein the flexible retroreflective film has a Young's modulus ranging from 45 ksi to 275 ksi.

Embodiment 34: An embodiment of any of the embodiments of embodiment 29-33, wherein the interleaf layer has a thickness ranging from 0.2 mil to 4 mil.

Embodiment 35: An embodiment of embodiment 29-34, wherein the emboss layer has a thickness ranging from 0.5 mil to 10 mil.

Embodiment 36: An embodiment of any of the embodiments of embodiment 29-35, wherein the ratio of the emboss layer thickness to the interleaf layer thickness ranges from 0.1 to 20.

Embodiment 37: An embodiment of any of the embodiments of embodiment 29-36, wherein the interleaf layer comprises one or more polymers selected from the group consisting of polyethylene terephthalate, polyvinyl chloride, polycarbonate, ethylene-vinyl acetate, polyolefin, and polyurethane.

Embodiment 38: An embodiment of any of the embodiments of embodiment 29-37, wherein the emboss layer comprises one or more polymers selected from the group consisting of acrylic, polycarbonate, and polyurethane.

Embodiment 39: An embodiment of any of the embodiments of embodiment 29-38, wherein the retroreflective elements are metallized.

Embodiment 40: An embodiment of any of the embodiments of embodiment 29-39, wherein the first adhesive layer and the second adhesive layer each independently comprise a pressure sensitive adhesive.

Embodiment 41: An embodiment of any of the embodiments of embodiment 29-40, further comprising: a flexible face layer connected to the emboss layer front surface.

Embodiment 42: An embodiment of embodiment 41, wherein the flexible face layer has a thickness ranging from 1 mil to 35 mil.

Embodiment 43: An embodiment of embodiment 41 or 42, wherein the ratio of the flexible face layer thickness to the emboss layer thickness ranges from 0.1 to 70.

Embodiment 44: An embodiment of any of the embodiments of embodiment 41-43, wherein the ratio of the flexible face layer thickness to the interleaf layer thickness ranges from 0.25 to 175.

Embodiment 45: An embodiment of any of the embodiments of embodiment 41-44, wherein the flexible face layer comprises one or more polymers selected from the group consisting of acrylic, polycarbonate, polyolefin, and polyurethane.

Embodiment 46: An embodiment of any of the embodiments of embodiment 29-45, further comprising: a release liner attached to the second adhesive layer opposite the interleaf layer.

Embodiment 47: An embodiment of any of the embodiments of embodiment 29-46, wherein the interleaf layer has an opacity greater than 58% and an interleaf color with a CIEDE2000 color difference from the emboss color of less than 10.

Embodiment 48: An embodiment of any of the embodiments of embodiment 29-47, wherein the interleaf layer has an opacity greater than 58%, and wherein the flexible retroreflective sheeting has a tensile strength ranging from 30% to 150%.

Embodiment 49: A method for producing a flexible retroreflective sheeting, the method comprising: thermally embossing an emboss layer, thereby forming a plurality of retroreflective elements on a back surface of the emboss layer; connecting a metallized layer directly to the emboss layer back surface; coating a first face of an interleaf layer with a first adhesive layer, and an opposite second face of the interleaf layer with a second adhesive layer, thereby forming a transfer tape; and laminating the transfer tape to the metallized layer opposite the emboss layer.

Embodiment 50: An embodiment of embodiment 49, wherein the thermally embossing further attaches a flexible face layer to a front surface of the emboss layer opposite the emboss layer back surface.

Embodiment 51: An embodiment of embodiment 49 or 50, further comprising: attaching a release liner to the second adhesive layer opposite the interleaf layer.

Embodiment 52: A method of applying a flexible retroreflective sheeting to a surface, the method comprising: providing a surface having an outer face; providing the retroreflective sheeting of any of the embodiments of embodiment 1-24 and 29-48; and adhering the second layer of the retroreflective sheeting to the outer face of the surface.

Embodiment 53: An embodiment of embodiment 52, wherein the surface comprises one or more polymers selected from the group consisting of polyvinyl chloride, linear low-density polyethylene, low-density polyethylene, high-density polyethylene, and polycarbonate.

Embodiment 54: An article comprising: a surface having an outer face; and the retroreflective sheeting of any of the embodiments of embodiment 1-24 and 29-48 adhered to the outer face of the surface.

Embodiment 55: An embodiment of embodiment 54, wherein the surface comprises one or more polymers selected from the group consisting of polyvinyl chloride, linear low-density polyethylene, low-density polyethylene, high-density polyethylene, and polycarbonate Examples The present disclosure will be better understood in view of the following non-limiting example.

A series of retroreflective sheeting constructions were assembled as shown in Table 1 below. Each sheeting included a polyvinyl chloride (PVC) face layer, a white acrylic emboss layer, and a polyvinyl chloride backing layer. Examples 1 and 2 included a clear interleaf layer sandwiched between two layers of S-9700 adhesive, commercially available from Avery Dennison (Glendale, CA). Examples 3, 4, and 5 included a white pigmented interleaf layer between two S-9700 adhesive layers. Two comparative retroreflective sheeting constructions were also prepared. These Comparative A and Comparative B samples included similar face, emboss, and backing layers to those of Examples 1-5, but did not include an interleaf layer.

Each of the sheeting constructions was applied in the form of top and bottom cone collars to polyvinyl chloride traffic cones. These cones were then subjected to tests that included stepping on the collars in an indoor environment, and driving on the collars with a car in two passes in an outdoor environment after the cones were stored at a temperature of 38° F. for 2 hours. Results from these crush tests, as well as from tests of different tensile properties, are also presented in Table 1 below.

TABLE 1

|  | Face Layer | Emboss Layer | Backing Layer | Interleaf Layer | Tensile Strain (%) | Force at Break (lbf) | Young's Modulus (ksi) | Step Crush Test | Car Crush Test |
|---|---|---|---|---|---|---|---|---|---|
| Ex. 1 | 2.5 mil acrylic | 15 mil PVC | PVC | Clear | 116.49 | 29.14 | 71.2 | No visible cracks | Visible cracking |
| Ex. 2 | 2.5 mil acrylic | 15 mil PVC | PVC | Clear | 43.18 | 24.34 | 55.9 | No visible cracks | Visible cracking |
| Ex. 3 | 2.5 mil acrylic | 15 mil PVC | PVC | White | 121.51 | 28.69 | 66.3 | No visible cracks | No visible cracks |
| Ex. 4 | 2.5 mil acrylic | 15 mil PVC | PVC | White | 106.2 | 31.52 | 68.1 | No visible cracks | No visible cracks |
| Ex. 5 | 2.5 mil acrylic | 15 mil PVC | PVC | White | 33.79 | 23.92 | 70 | No visible cracks | No visible cracks |
| Comp. A | 2.5 mil acrylic | 15 mil PVC | PVC | None | 26.79 | 24.48 | 63.4 | Visible cracking |  |
| Comp. B | 2.5 mil acrylic | 15 mil PVC | PVC | None | 41.89 | 23.01 | 44.3 | Visible cracking |  |

The results in Table 1 demonstrate that the inclusion of an interleaf layer in the flexible retroreflective sheeting as described herein allows the sheeting to better withstand the stresses of a step crush test simulating pedestrian collisions with traffic safety devices such as traffic cones. The results further demonstrate that the color matching of the interleaf layer with the emboss layer of the sheeting constructions allows the sheeting to minimize or prevent the formation of visible cracks under the greater force of a car crush test simulating vehicular collisions.

While the disclosure has been described in detail, modifications within the spirit and scope of the disclosure will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

I claim:

1. A flexible retroreflective sheeting comprising:
    an emboss layer having a front surface and an opposite back surface comprising a plurality of retroreflective elements;
    a flexible backing layer in contact with the emboss layer back surface;
    a first adhesive layer connected to the flexible backing layer opposite the emboss layer;
    an interleaf layer having an opacity greater than 40% and connected to the first adhesive layer opposite the flexible backing layer; and
    a second adhesive layer connected to the interleaf layer opposite the first adhesive layer,
    wherein the emboss layer has an emboss color, and wherein the interleaf layer has an interleaf color with a CIEDE2000 color difference from the emboss color of less than 20, or
    wherein the emboss layer is transparent, wherein the flexible backing layer has a backing color, and wherein the interleaf layer has an interleaf color with a CIEDE2000 color difference from the backing color of less than 20.

2. The flexible retroreflective sheeting of claim 1, wherein the interleaf layer comprises a pigmented film.

3. The flexible retroreflective sheeting of claim 1, having a tensile strain ranging from 30% to 200%.

4. The flexible retroreflective sheeting of claim 1, having a force at break ranging from 20 lbf to 60 lbf.

5. The flexible retroreflective sheeting of claim 1, having a Young's modulus ranging from 45 ksi to 275 ksi.

6. The flexible retroreflective sheeting of claim 1, wherein the interleaf layer has a thickness ranging from 0.2 mil to 4 mil.

7. The flexible retroreflective sheeting of claim 1, wherein the emboss layer has a thickness ranging from 0.5 mil to 10 mil.

8. The flexible retroreflective sheeting of claim 1, wherein the ratio of the emboss layer thickness to the interleaf layer thickness ranges from 0.1:1 to 20:1.

9. The flexible retroreflective sheeting of claim 1, wherein the interleaf layer comprises one or more polymers selected from the group consisting of polyethylene terephthalate, polyvinyl chloride, polycarbonate, ethylene-vinyl acetate, polyolefin, and polyurethane.

10. The flexible retroreflective sheeting of claim 1, wherein the flexible backing layer comprises one or more polymers selected from the group consisting polyvinyl chloride, polycarbonate, ethylene-vinyl acetate, polyolefin, and polyurethane.

11. The flexible retroreflective sheeting of claim 1, wherein the emboss layer comprises one or more polymers selected from the group consisting of acrylic, polycarbonate, and polyurethane.

12. The flexible retroreflective sheeting of claim 1, wherein the flexible backing layer is directly attached to a portion of the emboss layer back surface, and wherein the flexible backing layer and the retroreflective elements define a plurality of air gaps.

13. The flexible retroreflective sheeting of claim 1, wherein the first adhesive layer and the second adhesive layer each independently comprise a pressure sensitive adhesive.

14. The flexible retroreflective sheeting of claim 1, further comprising:
    a flexible face layer connected to the emboss layer front surface.

15. The flexible retroreflective sheeting of claim 14, wherein the flexible face layer has a thickness ranging from 1 mil to 35 mil.

16. The flexible retroreflective sheeting of claim 14, wherein the ratio of the flexible face layer thickness to the emboss layer thickness ranges from 0.1:1 to 70:1.

17. The flexible retroreflective sheeting of claim 14, wherein the ratio of the flexible face layer thickness to the interleaf layer thickness ranges from 0.2:1 to 175:1.

18. The flexible retroreflective sheeting of claim 14, wherein the flexible face layer comprises one or more polymers selected from the group consisting of acrylic, polycarbonate, polyolefin, and polyurethane.

19. The flexible retroreflective sheeting of claim 1, further comprising:
    a release liner attached to the second adhesive layer opposite the interleaf layer.

20. The flexible retroreflective sheeting of claim 1, having a tensile strength ranging from 30% to 150%.

21. A method of applying a flexible retroreflective sheeting to a surface, the method comprising:
    providing a surface having an outer face;
    providing the flexible retroreflective sheeting of claim 1; and
    adhering the second layer of the flexible retroreflective sheeting to the outer face of the surface.

22. The method of claim 21, wherein the surface comprises one or more polymers selected from the group consisting of polyvinyl chloride, linear low-density polyethylene, low-density polyethylene, high-density polyethylene, and polycarbonate.

23. An article comprising:
    a surface having an outer face; and
    the flexible retroreflective sheeting of claim 1 adhered to the outer face of the surface.

24. The article of claim 23, wherein the surface comprises one or more polymers selected from the group consisting of polyvinyl chloride, linear low-density polyethylene, low-density polyethylene, high-density polyethylene, and polycarbonate.

25. A flexible retroreflective sheeting comprising:
    an emboss layer having a front surface and an opposite back surface comprising a plurality of retroreflective elements, wherein the emboss layer has an emboss color;
    a metallized layer directly on the emboss layer back surface;
    a first adhesive layer connected to the metallized layer opposite the emboss layer;
    an interleaf layer connected to the first adhesive layer opposite the metallized layer, wherein the interleaf layer has an opacity greater than 40% and an interleaf color with a CIEDE2000 color difference from the emboss color of less than 20; and
    a second adhesive layer connected to the interleaf layer opposite the first adhesive layer.

26. The flexible retroreflective sheeting of claim 25, wherein the interleaf layer comprises a cavitated film.

27. The flexible retroreflective sheeting of claim 25, having a tensile strain ranging from 30% to 200%.

28. The flexible retroreflective sheeting of claim 25, having a force at break ranging from 20 lbf to 60 lbf.

29. The flexible retroreflective sheeting of claim 25, having a Young's modulus ranging from 45 ksi to 275 ksi.

30. The flexible retroreflective sheeting of claim 25, wherein the interleaf layer has a thickness ranging from 0.2 mil to 4 mil.

31. The flexible retroreflective sheeting of claim 25, wherein the emboss layer has a thickness ranging from 0.5 mil to 10 mil.

32. The flexible retroreflective sheeting of claim 25, wherein the ratio of the emboss layer thickness to the interleaf layer thickness ranges from 0.1 to 20.

33. The flexible retroreflective sheeting of claim 25, wherein the interleaf layer comprises one or more polymers selected from the group consisting of polyethylene terephthalate, polyvinyl chloride, polycarbonate, ethylene-vinyl acetate, polyolefin, and polyurethane.

34. The flexible retroreflective sheeting of claim 25, wherein the emboss layer comprises one or more polymers selected from the group consisting of acrylic, polycarbonate, and polyurethane.

35. The flexible retroreflective sheeting of claim 25, wherein the retroreflective elements are metallized.

36. The flexible retroreflective sheeting of claim 25, wherein the first adhesive layer and the second adhesive layer each independently comprise a pressure sensitive adhesive.

37. The flexible retroreflective sheeting of claim 25, further comprising:
    a flexible face layer connected to the emboss layer front surface.

38. The flexible retroreflective sheeting of claim 37, wherein the flexible face layer has a thickness ranging from 1 mil to 35 mil.

39. The flexible retroreflective sheeting of claim 37, wherein the ratio of the flexible face layer thickness to the emboss layer thickness ranges from 0.1 to 70.

40. The flexible retroreflective sheeting of claim 37, wherein the ratio of the flexible face layer thickness to the interleaf layer thickness ranges from 0.25 to 175.

41. The flexible retroreflective sheeting of claim 37, wherein the flexible face layer comprises one or more polymers selected from the group consisting of acrylic, polycarbonate, polyolefin, and polyurethane.

42. The flexible retroreflective sheeting of claim 25, further comprising:
    a release liner attached to the second adhesive layer opposite the interleaf layer.

43. The flexible retroreflective sheeting of claim 25, wherein the interleaf layer has an opacity greater than 58% and an interleaf color with a CIEDE2000 color difference from the emboss color of less than 10.

44. The flexible retroreflective sheeting of claim 25, wherein the interleaf layer has an opacity greater than 58%, and wherein the flexible retroreflective sheeting has a tensile strength ranging from 30% to 150%.

* * * * *